UNITED STATES PATENT OFFICE.

CARL KOLBE, OF RADEBEUL, SAXONY, GERMANY, ASSIGNOR TO DR. F. VON HEYDEN, NACHFOLGER, OF SAME PLACE.

MANUFACTURE OF SALICYLIC ACID ESTER.

SPECIFICATION forming part of Letters Patent No. 377,311, dated January 31, 1888.

Application filed September 15, 1887. Serial No. 249,790. (No specimens.)

*To all whom it may concern:*

Be it known that I, CARL KOLBE, a subject of the King of Saxony, residing at Radebeul, Saxony, German Empire, have invented certain new and useful Improvements in the Manufacture of Salicylic Acid Esters; and I do hereby declare the following to be a full, clear, and exact description of the invention, such as will enable others skilled in the art to which it appertains to make and use the same.

This invention relates to an improved process of manufacturing salicylic acid esters.

In Letters Patent No. 350,012, granted to Dr. F. Von Heyden, Nachfolger, as assignee of Nencki and Seifert, September 28, 1886, a compound ether is described which is known as "salol," and which is produced by the action of oxychloride of phosphorus upon a mixture of salicylic acid and a phenol. I have found that by substituting phosgene gas ($COCl_2$) for oxychloride of phosphorus the process of manufacturing salol is not only cheapened, but the reaction is materially facilitated.

In carrying out my invention I prepare a mixture of equal molecules of salicylic acid and phenol, and through this mixture I pass phosgene gas. At the ordinary temperature no reaction takes place; but if the temperature is raised hydrochloric acid and carbonic acid escape and the product which remains consists of almost pure salol. The temperature best suited for my purpose is between 170° and 190° centigrade. Below 150° the reaction is very slow. The following equation will explain the reaction:

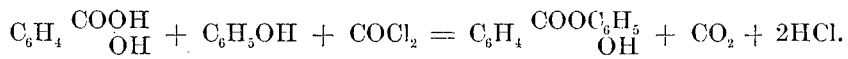

$$C_6H_4\genfrac{}{}{0pt}{}{COOH}{OH} + C_6H_5OH + COCl_2 = C_6H_4\genfrac{}{}{0pt}{}{COOC_6H_5}{OH} + CO_2 + 2HCl.$$

Instead of free salicylic I can use the salts of the same; but if instead of phenol the salts of phenol are used a very impure product is obtained.

In carrying out my process different phenols may be used—such, for instance, as resorcin, the two naphthols, and dioxynaphthaline.

I do not claim anything described in Patent No. 350,012.

What I claim as new, and desire to secure by Letters Patent, is—

The within-described process of producing salol, which consists in mixing together equal molecules of salicylic acid with equal molecules of a phenol, raising the temperature to about 170° centigrade, and then passing a current of phosgene gas through the mixture, substantially as set forth.

In testimony whereof I affix my signature in presence of two witnesses.

CARL KOLBE.

Witnesses:
PAUL DRUCKMÜLLER,
E. DORNSCH.